(12) United States Patent
Clark et al.

(10) Patent No.: US 9,314,812 B2
(45) Date of Patent: Apr. 19, 2016

(54) JETTING DISCRETE VOLUMES OF HIGH VISCOSITY LIQUID

(75) Inventors: Justin A. Clark, Sugar Hill, GA (US); John M. Riney, Buford, GA (US); Edward C. Taylor, Cumming, GA (US)

(73) Assignee: Nordson Corporation, Westlake, OH (US)

( * ) Notice: Subject to any disclaimer, the term of this patent is extended or adjusted under 35 U.S.C. 154(b) by 622 days.

(21) Appl. No.: 13/515,610

(22) PCT Filed: Jan. 7, 2011

(86) PCT No.: PCT/US2011/020489
§ 371 (c)(1),
(2), (4) Date: Jul. 12, 2012

(87) PCT Pub. No.: WO2011/087961
PCT Pub. Date: Jul. 21, 2011

(65) Prior Publication Data
US 2012/0312838 A1    Dec. 13, 2012

Related U.S. Application Data

(60) Provisional application No. 61/294,972, filed on Jan. 14, 2010.

(51) Int. Cl.
*B67D 7/80* (2010.01)
*B05C 11/10* (2006.01)
(Continued)

(52) U.S. Cl.
CPC ........... *B05C 11/1034* (2013.01); *B05C 5/0225* (2013.01); *B05C 5/0275* (2013.01);
(Continued)

(58) Field of Classification Search
CPC .............. B05C 5/0225; B05C 11/1028; B05C 11/1034; B05C 5/02; B05C 5/0275; B05C 5/0291; B23K 3/0638; B23K 3/0623
USPC .................... 222/420, 422, 146.2, 146.5, 504
See application file for complete search history.

(56) References Cited

U.S. PATENT DOCUMENTS 3,826,224 A    7/1974  Baker et al.
4,441,450 A    4/1984  Dettelbach et al.
(Continued)

FOREIGN PATENT DOCUMENTS

DE    69609071 T2    3/2001
EP    0839116 A1    5/1998
(Continued)

OTHER PUBLICATIONS

Australian Patent Office, Patent Examination Report No. 1 in Australian Application No. 2011205506, Mar. 8, 2013.
(Continued)

*Primary Examiner* — J. Casimer Jacyna
(74) *Attorney, Agent, or Firm* — Baker & Hostetler LLP

(57) ABSTRACT

In one aspect, an adhesive dispensing system 30 includes a dispensing module 32 having an inlet and an outlet, a supply 35 of hot melt adhesive maintained at low pressure, and a low pressure liquid passageway 44 communicating between the supply 35 and the inlet of the dispensing module 32. Liquid material is received through the inlet at a low pressure, and the dispensing module 32 rapidly develops high pressure at the outlet 78 to jet the liquid material from the outlet 78. In another aspect, an apparatus for jetting liquid material includes a dispenser body 38 having a liquid chamber 40. A piston 54 is movably disposed within the liquid chamber 40, from a position wherein a piston tip 58 is spaced from a complimentary shaped recess 76, to a position wherein the piston tip 58 effectively seals off the recess 76, then to a position wherein the piston tip 58 is received within the recess 76 to displace a discrete volume of liquid material from the recess 76.

11 Claims, 13 Drawing Sheets

(51) Int. Cl.
*B05C 5/02* (2006.01)
*B23K 3/06* (2006.01)
*B05C 11/11* (2006.01)

(52) U.S. Cl.
CPC ............ *B05C 11/10* (2013.01); *B05C 11/1028* (2013.01); *B23K 3/0623* (2013.01); *B23K 3/0638* (2013.01); *B05C 5/025* (2013.01); *B05C 11/1042* (2013.01); *B05C 11/11* (2013.01)

(56) References Cited

U.S. PATENT DOCUMENTS

| | | |
|---|---|---|
| 4,474,311 A | 10/1984 | Petrecca |
| 4,516,700 A | 5/1985 | Guzowski |
| 4,527,717 A | 7/1985 | Emoto et al. |
| 4,534,493 A | 8/1985 | Sedran |
| 4,784,582 A | 11/1988 | Howseman, Jr. |
| 4,898,527 A | 2/1990 | Claassen |
| 5,584,419 A | 12/1996 | Lasko |
| 5,680,963 A | 10/1997 | Brusko et al. |
| 5,715,972 A | 2/1998 | Siddiqui |
| 5,747,102 A | 5/1998 | Smith et al. |
| 5,875,922 A | 3/1999 | Chastine et al. |
| 5,924,607 A | 7/1999 | Yamada et al. |
| 6,202,892 B1 | 3/2001 | Lasko |
| 6,223,950 B1 | 5/2001 | Lasko |
| 6,230,936 B1 | 5/2001 | Lasko |
| 6,253,957 B1 | 7/2001 | Messerly et al. |
| 6,799,702 B1 | 10/2004 | Mercer et al. |
| 7,626,143 B2 | 12/2009 | Miller |
| 7,755,009 B2 | 7/2010 | Lasko |
| 7,785,673 B2 | 8/2010 | Lasko |
| 7,886,935 B2 | 2/2011 | Lasko |
| 7,980,197 B2 | 7/2011 | Prentice et al. |
| 8,080,117 B1 | 12/2011 | Lasko |
| 8,167,516 B2 | 5/2012 | Lasko |
| 8,201,717 B2 | 6/2012 | Varga et al. |
| 2004/0118865 A1 | 6/2004 | Maruyama et al. |
| 2005/0230423 A1 | 10/2005 | Riney et al. |
| 2005/0236438 A1 | 10/2005 | Chastine et al. |
| 2006/0182887 A1 | 8/2006 | Miller |
| 2008/0190365 A1 | 8/2008 | Lasko |
| 2008/0191391 A1 | 8/2008 | Lasko |
| 2008/0205998 A1 | 8/2008 | Lasko |
| 2009/0261121 A1 | 10/2009 | Varga |
| 2010/0270289 A1 | 10/2010 | Lasko |
| 2011/0142552 A1 | 6/2011 | Lasko |
| 2011/0300295 A1 | 12/2011 | Clark et al. |
| 2012/0018425 A1 | 1/2012 | Lasko |
| 2012/0312838 A1 | 12/2012 | Clark et al. |
| 2014/0117049 A1 | 5/2014 | Varga |

FOREIGN PATENT DOCUMENTS

| | | |
|---|---|---|
| EP | 1802191 A2 | 6/2007 |
| EP | 2119509 A2 | 11/2009 |
| GB | 2457220 A | 8/2009 |
| JP | 5850910 U | 4/1983 |
| JP | 9220504 | 8/1997 |
| JP | 2000033322 A | 2/2000 |
| JP | 2002513674 A | 5/2002 |
| JP | 2004141866 A | 5/2004 |
| WO | 96/35636 A1 | 11/1996 |
| WO | 9956889 A1 | 11/1999 |
| WO | 0062941 A1 | 10/2000 |
| WO | 2007/084891 A2 | 7/2007 |
| WO | 2011/087961 A1 | 7/2011 |

OTHER PUBLICATIONS

U.S. Patent and Trademark Office, International Search Report and Written Opinion in PCT Application Serial No. PCT/US2011/020489, Mar. 1, 2011.
U.S. Patent and Trademark Office, International Preliminary Report on Patentability in PCT Application Serial No. PCT/US2011/020489, May 16, 2012.
Robatech AG, ACX 100 Series, Applicator heads for coldglue, 2 pgs., undated.
Robatech AG, SX Series, Applicator heads for Hotmelts, 4 pgs., undated.
Japanese Patent Office, Notification of Reason for Rejection in JP Application No. 2012-548980, Aug. 21, 2014.
Meltex Gmbh, Hot Melt Applicator MX 2003, Brochure, May 1989, 2 pages.
Meltex Corporation, Hot Melt Applicator MP 400, Brochure, undated- material predates at least 2004, 1 page.
Meltex Gmbh, Hot Melt Applicator MX 2001, Brochure, May 1989, 2 pages.
European Patent Office, European Extended Search Report in EP Application No. 13187931, Feb. 26, 2014, 8 pages.
Nordson Corporation, AD-25 Hand Gun, Brochure, Oct. 1976, 2 pages.
European Patent Office, Supplementary European Search Report in EP Application No. 11723219, Dated Feb. 13, 2014.

_US 9,314,812 B2_

JETTING DISCRETE VOLUMES OF HIGH VISCOSITY LIQUID

CROSS REFERENCE TO RELATED APPLICATIONS

This application claims the benefit of priority of U.S. Provisional Patent Application Ser. No. 61/294,972, filed Jan. 14, 2010, the disclosure of which is hereby incorporated by reference herein in its entirety.

TECHNICAL FIELD

The present invention relates generally to apparatus and methods for dispensing liquid materials, and more particularly to a jetting dispenser for jetting discrete volumes of high viscosity liquids.

BACKGROUND

Liquid dispensers for jetting relatively low viscosity fluids such as solder flux, conformal coatings, encapsulants, underfill material, and surface mount adhesives, are known in the art and generally operate to dispense small volumes of liquid material to a substrate by rapidly contacting a valve seat with a valve member to create a distinct, high pressure pulse that ejects a small volume of liquid from the dispenser. As used herein, liquid material jetting refers to rapidly ejecting a discrete mass of liquid material at a high velocity from a dispenser. Jetting is contrasted with extrusion wherein liquid material is dispensed as a continuous, elongate filament, generally referred to as a "bead" of adhesive. While drops can be formed by rapidly opening and closing a valve during extrusion of liquid material, or by using air to break up an extruded bead as it is dispensed, these processes are distinctly different from jetting processes wherein the discrete liquid mass is rapidly ejected directly from the dispenser at a high velocity.

FIGS. 1A and 1B illustrate the operation of a conventional jetting dispenser 10. In FIG. 1A, a valve member 12 is rapidly moved through a fluid channel 14 in the direction of a valve seat 16 having an outlet 18. As the valve member 12 approaches the valve seat 16, liquid material 20 within the channel 14 flows around the valve tip 12a. FIG. 1B depicts the jetting dispenser 10 at the instant the valve tip 12a contacts valve seat 16. The momentum of the impact between valve member 12 and valve seat 16 generates a pressure pulse that causes a small volume of liquid 20a to be ejected through the outlet 18. U.S. Pat. No. 5,747,102 to Smith et al. and U.S. Pat. No. 6,253,957 to Messerly et al., both assigned to the assignee of the present application, are directed to jetting dispensers.

Conventional jetting dispensers require precise timing control to ensure that a consistent volume of liquid material is jetted from the dispenser. For example, if the valve timing is too fast, there is insufficient time for liquid material to refill within the dispenser, resulting in a lower than desired volume of liquid dispensed. Likewise, if the timing is too slow, the resulting volume of liquid is higher than desired. It has long been thought that hot melt adhesive could not be adequately dispensed by a jetting dispenser, due to the high viscosity of hot melt adhesives and the differences in general rheology between hot melt adhesives and liquid materials that have been conventionally used in jetting processes. Accordingly, hot melt adhesives have generally been dispensed by dedicated hot melt adhesive dispensing systems that utilize high pressure to supply adhesive to a dispensing module. Typical pressures are in the range of 400 psi to 1000 psi. A valve within the dispensing module is opened and closed to regulate the flow of the highly pressurized hot melt adhesive through an outlet nozzle. There is a need for methods and apparatus for dispensing highly viscous materials, such as hot melt adhesive, in discrete, small volumes and which overcome these and other drawbacks of conventional dispensing systems.

SUMMARY

The present invention overcomes the foregoing and other shortcomings and drawbacks of adhesive dispensing systems heretofore known for use in dispensing small, discrete volumes of liquid material, particularly highly viscous liquid material such as hot melt adhesive. While the invention will be described in connection with certain embodiments, it will be understood that the invention is not limited to these embodiments. On the contrary, the invention includes all alternatives, modifications and equivalents as may be included within the scope of the present invention.

In one aspect, a dispensing system for jetting liquid material includes an adhesive dispensing module having an inlet and an outlet, a supply of hot melt adhesive maintained at low pressure, and a low pressure liquid passageway communicating between the supply and the dispensing module inlet. The liquid material is received through the inlet at low pressure and the module rapidly develops high pressure to jet the liquid material from the outlet.

In another aspect, the adhesive dispensing module includes a liquid channel communicating with the outlet and a recess proximate the outlet. A piston is disposed in the channel, and the recess has a shape that is complementary to a tip of the piston. The high pressure that jets the liquid material from the outlet is developed as the piston tip is moved into the recess.

In one embodiment, the supply of hot melt adhesive is adapted to contain hot melt adhesive in solid form, and the dispensing system includes an auger for feeding the hot melt adhesive toward the dispensing module. In another embodiment, the dispensing system includes a vacuum feed device for feeding hot melt adhesive toward the dispensing module. In yet another embodiment, the dispensing system includes first and second adhesive dispensing modules having respective first and second inlets and first and second outlets. The first and second inlets receive liquid material at the same low pressure from the supply through respective first and second low pressure liquid passageways and the dispensing modules generate high pressure proximate the respective outlets to jet liquid material therefrom at different rates.

In another aspect, an apparatus for jetting liquid material includes a dispenser body having a liquid chamber that is couplable to a source of liquid material and a piston having a piston tip is movably disposed within the liquid chamber. A recess communicating with the liquid chamber and a liquid outlet has a shape that is complimentary to the shape of the piston tip, whereby the piston tip may be received in the recess. The piston is movable from a position wherein the piston tip is spaced from the recess, to a position wherein the piston tip effectively seals of the recess, then to a position wherein the piston tip is received within the recess to displace a discrete volume of liquid material from the recess.

In one embodiment, the apparatus further includes a nozzle that is operatively coupled to an open end of the dispenser body, in communication with the liquid chamber. The recess is formed in the nozzle. In another embodiment, the piston tip has a spherical shape.

In another aspect, a method for dispensing liquid material includes supplying the liquid material to a liquid chamber at a pressure sufficient to fill the liquid chamber, but not to dispense the liquid material from an outlet associated with a recess and communicating with the liquid chamber, effectively sealing off a discrete volume of liquid material proximate the recess, and generating a high pressure at the recess to jet the discrete volume of liquid material from the outlet.

The above and other objects and advantages of the present invention shall be made apparent from the accompanying drawings and the description thereof.

DETAILED DESCRIPTION

Figure 1A:
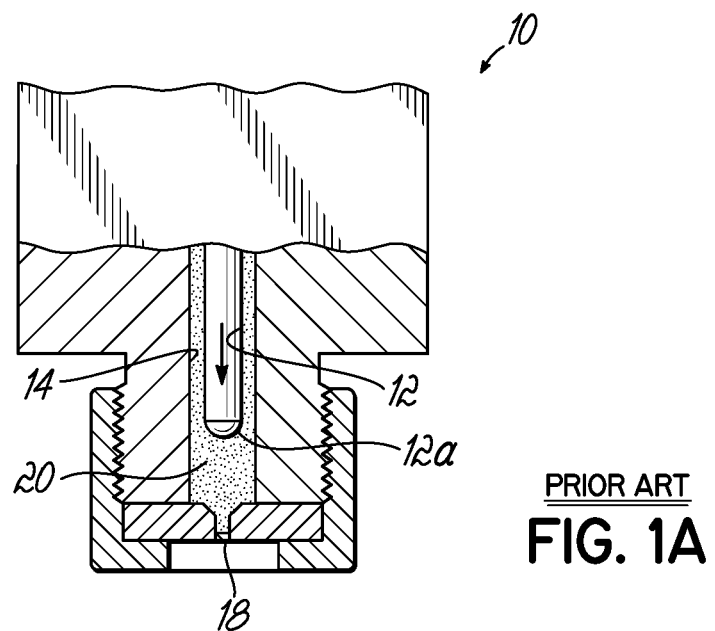
FIGS. 1A and 1B illustrate operation of a conventional jetting dispenser.
Figure 1B:
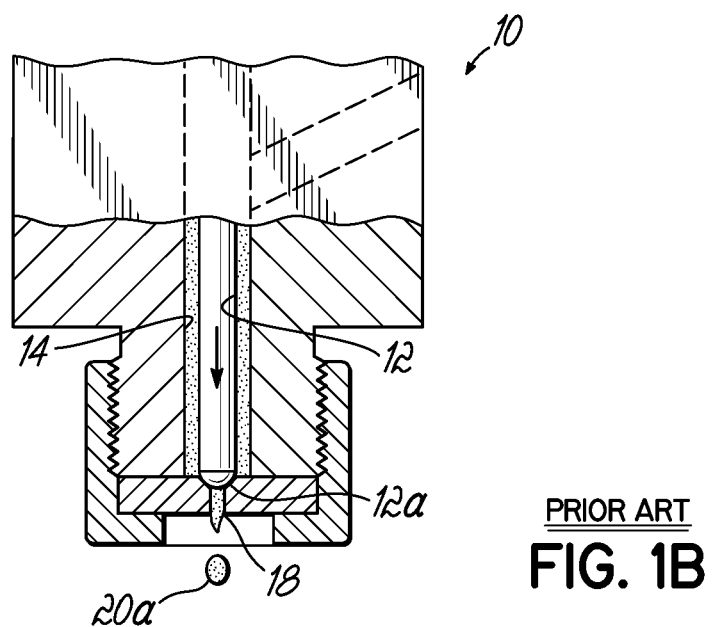
Figure 2:
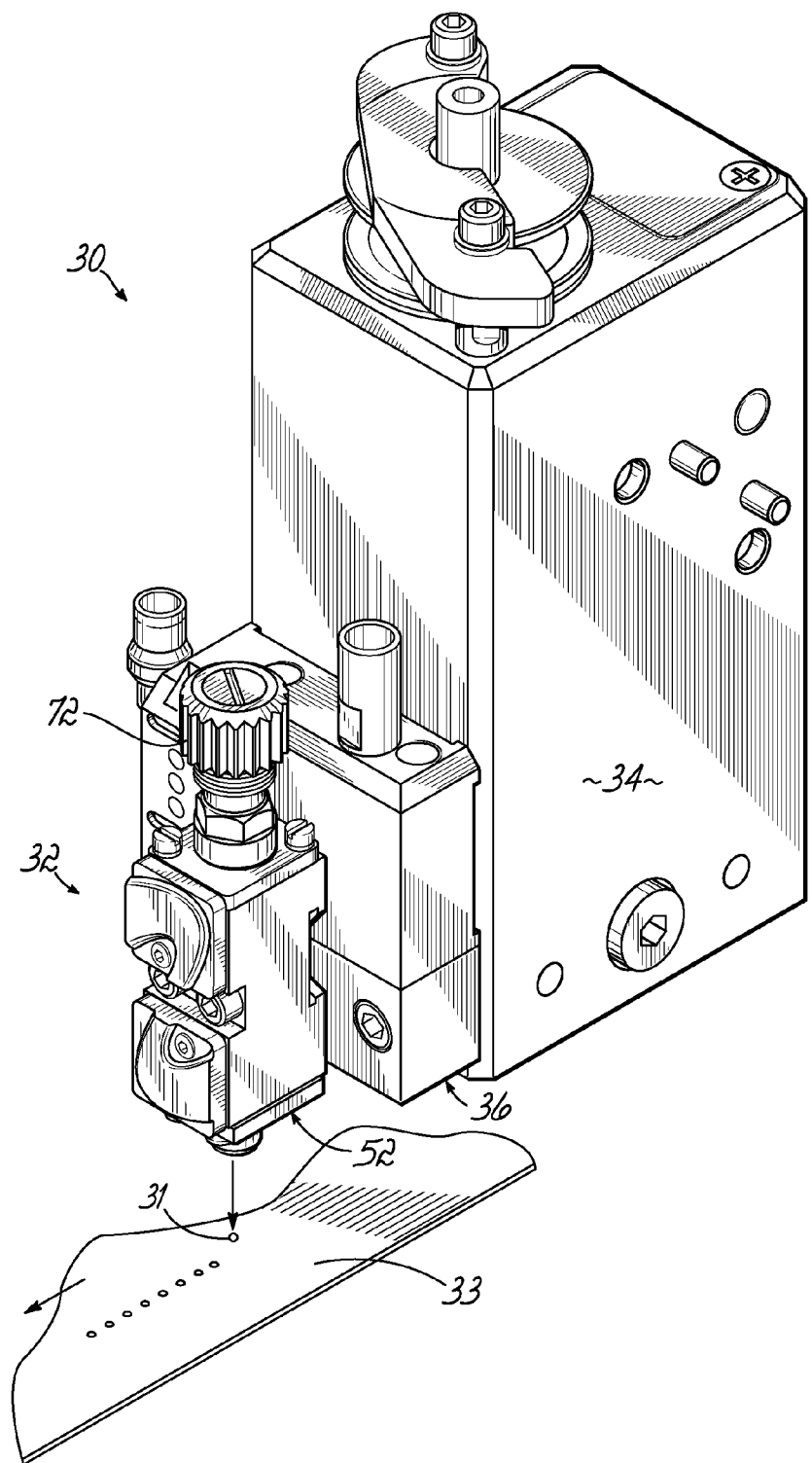
FIG. 2 is a perspective view of an exemplary dispensing system in accordance with the present disclosure.

FIG. 2 depicts an exemplary liquid dispensing system 30 for dispensing discrete, small volumes of highly viscous material 31, such as hot melt adhesive, to a substrate 33. For example, the dispensing system 30 may be used to dispense liquid material having viscosities in the range of about 100 cps to about 20,000 cps. In another aspect, the jetting dispenser 10 may be used to dispense material having viscosities in the range of about 100 cps to about 25,000 cps. The dispensing system 30 includes a liquid dispensing module 32 coupled to a source of liquid material. In the embodiment shown, the module 32 is coupled to an adhesive manifold 34 for providing heated hot melt adhesive to the module 32 at low pressure. For example, the pressure of the adhesive supplied to the module 32 may be in the range of about 5 psi to about 40 psi, or in other pressure ranges suitable for supplying hot melt adhesive to the module 32. The module 32 is also coupled to an air manifold 36 for providing pressurized air from a source (not shown) to the module 32.

Figure 3:
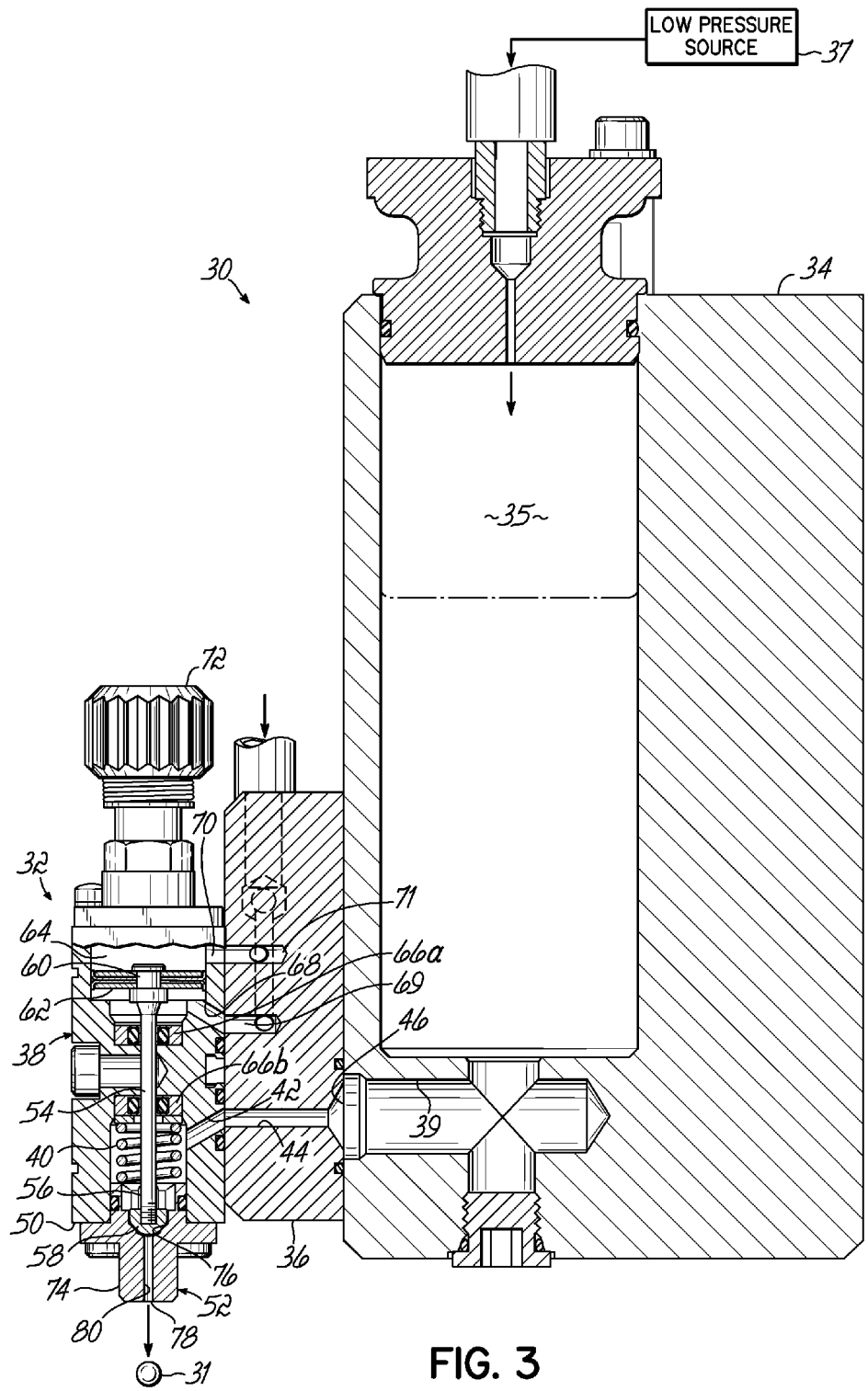
FIG. 3 is a cross-sectional view of the dispensing system of FIG. 2.
Figure 4:
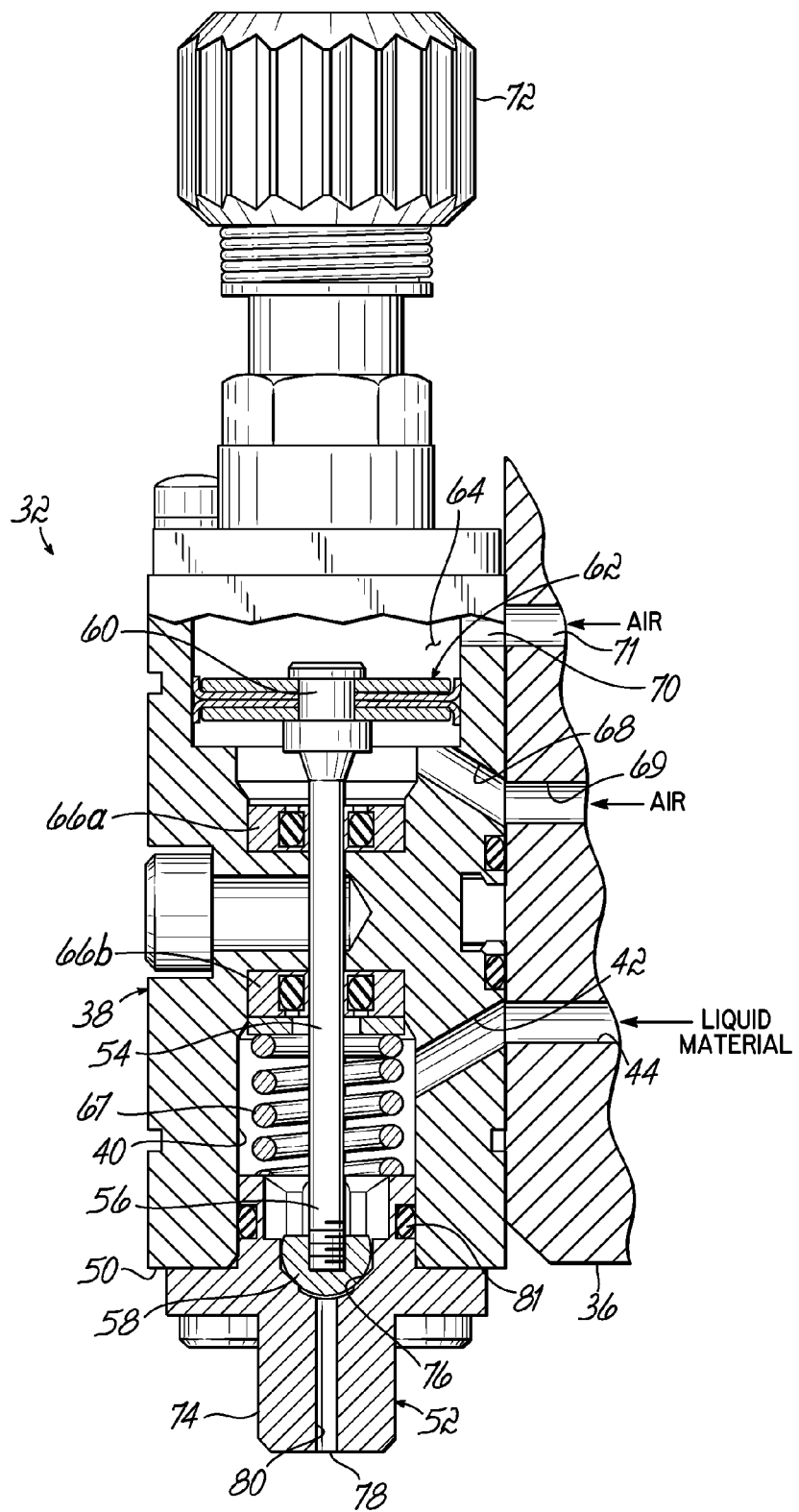
FIG. 4 is an enlarged detail view of the dispensing module of FIG. 3.

Referring now to FIGS. 3 and 4, the dispensing module 32 includes a module body 38 having a liquid chamber 40 formed therein. A liquid supply passage 42 communicates with the liquid chamber 40 to supply liquid material to the liquid chamber 40 from the adhesive manifold 34. In the embodiment shown, a liquid passageway 44 formed through the air manifold 36 communicates with an outlet 46 of the adhesive manifold 34 whereby liquid material flows from the outlet 46 of the adhesive manifold 34, through the liquid supply passageway 44 and the supply passage 42 of the module 32 to the liquid chamber 40. In the embodiment shown, manifold 34 includes a liquid reservoir 35 coupled to a pressure source 37 for providing hot melt adhesive at low pressure (for example, in the range of about 5 psi to about 40 psi or other suitable pressure ranges) through manifold passage 39 in communication with liquid passageway 44. Because liquid material is provided at such a low pressure, the dispensing system 30 does not require a piston pump, a gear pump, or other types of pumps that are typically required to develop high pressure. A simple diaphragm pump or pressure pot will suffice to provide the low pressure. It will be appreciated that various other arrangements and configurations may alternatively be used to supply hot melt adhesive or other material to the module 32.

The module body 38 includes an open first end 50 communicating with the liquid chamber 40 and adapted to receive a dispensing nozzle 52. The dispensing module 32 further includes a piston rod 54 having a first end 56 reciprocatingly moveable within the liquid chamber 40. A piston tip 58 is coupled to the first end 56 of the piston rod 54. While piston tip 58 has been shown and described in this embodiment as a separate component that is coupled to piston rod 54, piston tip 58 may alternatively be integrally formed with the piston rod 54. The second end 60 of the piston rod 54 is coupled to an air piston 62 that is slidably movable within a piston cavity 64 formed in the module body 38. Seals 66a, 66b disposed between the liquid chamber 40 and the piston cavity 64 permit sliding movement of the piston rod 54 while sealing the liquid chamber 40 from the piston cavity 64. A compression spring 67 biases seal 66b against module body 38 to seal liquid chamber 40 when nozzle 52 is coupled to the first end 50 of the module body 38. Pressurized air from an air source (not shown), is provided to the piston cavity 64 through air supply passages 68, 70 to rapidly move the air piston 62, and thus the piston rod 54 and the piston tip 58, in directions toward and away from the nozzle 52. In the embodiment shown, air supply passages 68, 70 are in fluid communication with air passages 69, 71 in air manifold 36, which are in turn operatively coupled with the air source. Pressurized air provided through air supply passage 68 drives the piston in a direction away from nozzle 52, while pressurized air provided through air supply passage 70 drives the piston in a direction toward nozzle 52. It will be appreciated that various other methods and configurations for providing pressurized air to the piston cavity 64 may alternatively be used. The module 32 further includes an adjustment knob 72 for selectively adjusting the stroke of the piston rod 54 to facilitate varying the speed of the piston rod 58 during each cycle of the piston rod 54. More stroke allows for greater acceleration and, therefore, higher velocity of the piston rod 54.

Nozzle 52 is coupled to the module body 38 at the open first end 50. The nozzle 52 includes a nozzle body 74 having a recess 76 formed in a shape that is complementary to the shape of the piston tip 58, whereby the piston tip 58 may be received within the recess 76. In the embodiment shown, the piston tip 58 is semi-spherical, and the recess 76 has a generally semi-spherical complementary shape. It will be appreciated, however, that nozzle tip 58 and recess 76 may have various other complementary shapes. The nozzle body 74 further includes an outlet 78 communicating with the recess 76 via a nozzle passageway 80, whereby liquid material in the liquid chamber 40 may be dispensed through the nozzle passageway 80 and nozzle outlet 78 when the piston tip 58 is received within the recess 76. Nozzle 52 may further include an O-ring 81 for sealing against module body 38 at the open first end 50.

Figure 5A:
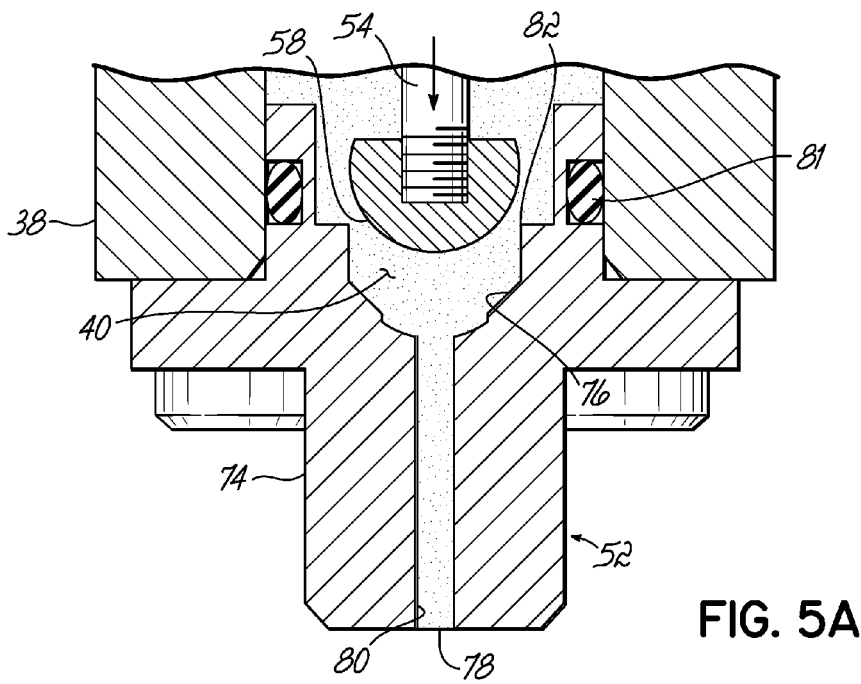
FIGS. 5A-5C are enlarged cross-sectional views illustrating operation of the dispensing system of FIG. 2.
Figure 5B:
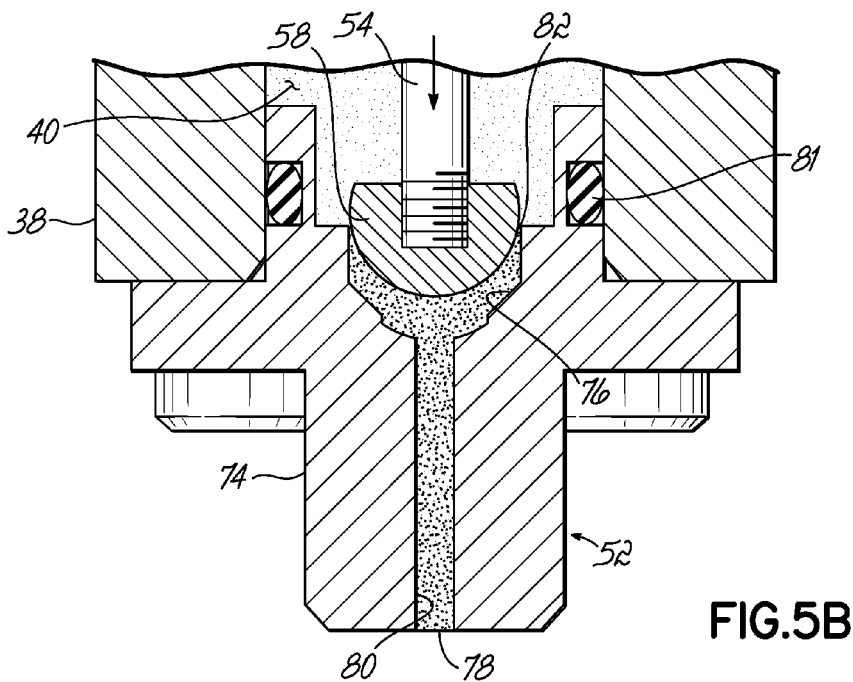

In operation, pressurized air is supplied to the piston cavity 64 through the air supply passage 68 to cause the piston rod 54 to move in a direction away from the nozzle 52, such that the piston tip 58 is withdrawn from the recess 76, as depicted generally in FIG. 5A, whereby liquid material enters the liquid chamber 40 to fill the liquid chamber 40 and the recess 76. Liquid material is supplied from the adhesive manifold 34 at a pressure sufficient to fill the liquid chamber 40 and recess 76, but not to cause liquid material to be dispensed from the nozzle outlet 78. Pressurized air is then supplied to the piston cavity 64 through air supply passage 70 to cause the piston rod 54 to rapidly move the piston tip 58 in a direction toward the nozzle 52. As the piston tip 58 begins to enter the recess 76, the piston tip 58 substantially seals the recess 76 along an upper edge 82 to define a discrete volume of liquid between the piston tip 58 and the recess 76, as depicted in FIG. 5B. It will be appreciated that there is some clearance between the piston tip 58 and the upper edge 82 of the recess 76 to permit the piston tip 58 to move into and out of the recess 76 without binding against the recess 76. As used herein, substantially sealing between the piston tip 58 and the recess 76 means that the clearance between the piston tip 58 and the upper edge 82 of the recess 76 is sufficiently small that liquid material is forced by the piston tip 58 to be displaced through the nozzle passageway 80 and nozzle outlet 78, rather than simply moving around the piston tip 58.

Figure 5C:
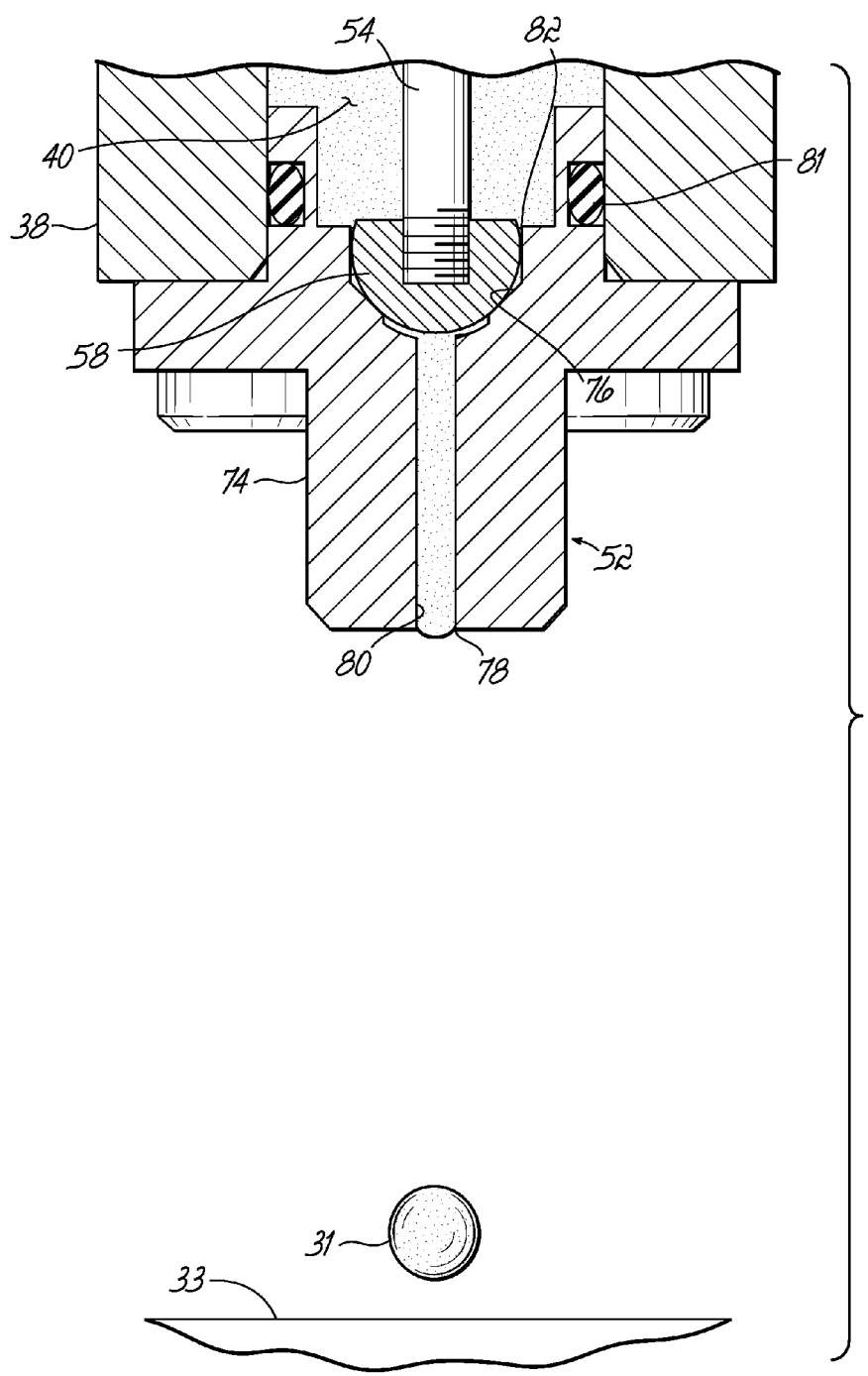

The piston rod 54 continues to move in a direction toward the nozzle 52 such that the piston tip 58 continues to enter the recess 76 and displaces the liquid material in the recess 76 through the nozzle passageway 80 and nozzle outlet 78, as depicted in FIG. 5C. Because the piston tip 58 effectively seals recess 76 as described above, a discrete volume of liquid material is defined and a high pressure is developed between the piston tip 58 and the recess 76 as piston tip 58 continues to enter the recess 76. The pressure generated may be in the range of about 100 psi to about 2500 psi. In another embodiment, the pressure generated may be in the range of about 400 psi to about 2500 psi. In this way, the discrete volume of liquid material 31 is jetted from the nozzle outlet 78 toward the substrate 33.

While module 32 has been described herein as having a piston rod 54 and a piston tip 58 driven by an air piston 62, it will be appreciated that various other structure and methods may alternatively be used to develop a high pressure near a nozzle outlet and to jet a discrete volume of liquid material therefrom.

After the discrete volume of liquid material 31 is jetted from the nozzle outlet 78, as described above, pressurized air may again be supplied to piston cavity 64 to cause piston rod 54 to move in a direction away from nozzle 52 and the entire process may be repeated to dispense successive discrete volumes of liquid material from nozzle outlet 78 as may be desired. It will be appreciated that operation of the dispensing system 30 as described above may be controlled by a controller to dispense the discrete volumes of liquid material at a desired frequency relative to the speed of a substrate 33 moving relative to the module 32 to produce a desired spacing between the discrete volumes of liquid material.

While operation of the module 32 has been described and illustrated in a manner wherein piston tip 58 becomes fully seated within recess 76 to dispense substantially the entire volume of liquid material within recess 76, it will be appreciated that the range of motion of piston 54 may alternatively be controlled such that piston tip 58 is not fully seated within recess 76 at the end of each stroke of piston 54, whereby an amount less than the entire volume of liquid material within recess 76 may be dispensed.

Figure 6:
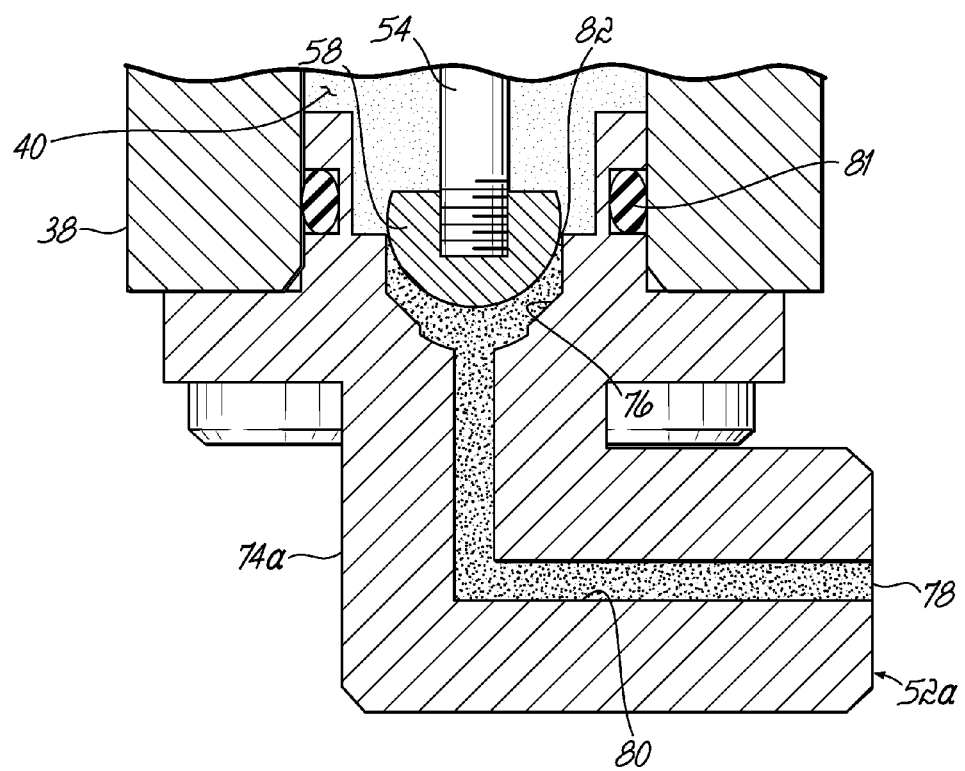
FIG. 6 is a cross-sectional view similar to FIGS. 5A-5C, depicting a second exemplary embodiment of a liquid dispensing system in accordance with the present disclosure.

FIG. 6 depicts another exemplary embodiment of a liquid dispensing system similar to the liquid dispensing system 30 described above, but wherein a modified dispensing nozzle 52*a* is coupled to the module body 38. The nozzle body 74*a* shown in this embodiment is configured to jet discrete volumes of liquid material through outlet 78 in a direction substantially perpendicular to the direction of movement of the piston rod 54. Operation of the dispensing system is otherwise similar to that described above with respect to FIGS. 2-5C and similar features are similarly numbered. Such an embodiment may be useful, for example, for jetting discrete volumes of liquid material to vertically oriented surfaces, such as the surfaces of labels or containers during labeling applications. While nozzle body 74*a* has been shown and described as having an outlet 78 configured to jet liquid material in a direction substantially perpendicular to the direction of movement of the piston rod 54, it will be appreciated that various other configurations of nozzle bodies may be used to jet liquid material in various other directions, or in various other manners, as may be desired for a given application.

Figure 7:
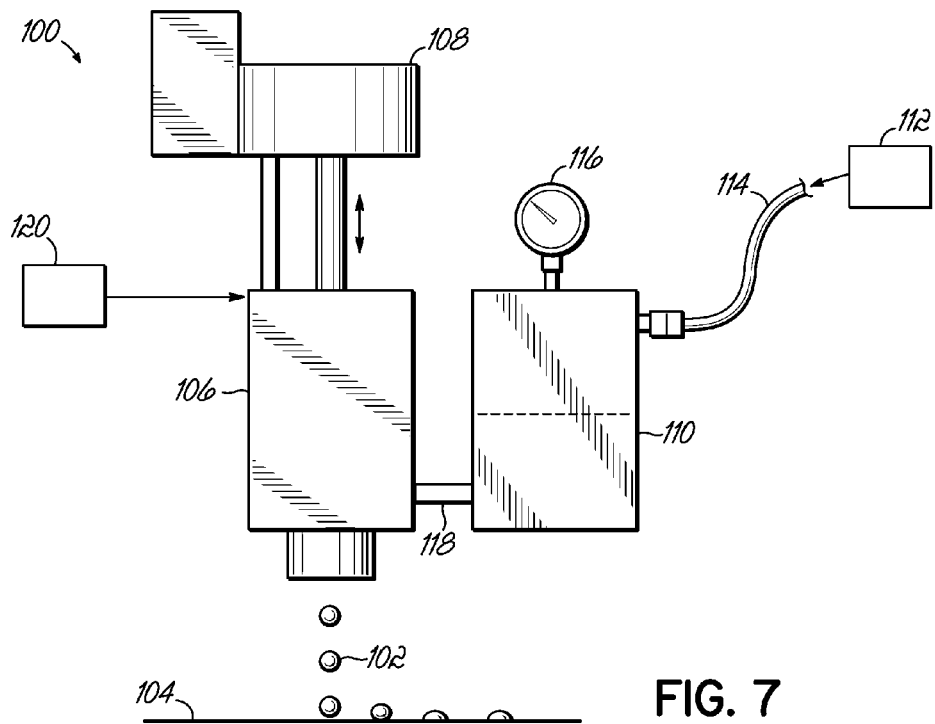
FIG. 7 is a schematic elevation view depicting a third exemplary dispensing system in accordance with the present disclosure.

FIG. 7 depicts another exemplary liquid dispensing system 100 for dispensing discrete, small volumes of highly viscous material 102, such as hot melt adhesive, to a substrate 104. The dispensing system 100 includes a dispensing module 106, as described above, operatively coupled to a support structure 108 for movement relative to the substrate 104. Because dispensing module 106 is constructed in a manner similar to module 32 described above, the details of module 106 are not repeated here. The dispensing system 100 further includes a pressure pot 110 containing a supply of hot melt adhesive and configured to provide the hot melt adhesive to the dispensing module 106 at a low pressure. The pressure pot 110 may be adapted to melt and/or maintain a heated temperature of the hot melt adhesive. The pressure pot 110 is coupled to a source of low pressure air 112, such as by a hose 114 or other appropriate connection. The pressure pot 110 further includes a gauge 116 for indicating the internal pressure of the pressure pot 110. Hot melt adhesive is transferred between the pressure pot 110 and the dispensing module 106 by a low pressure liquid passageway 118. The low pressure liquid passageway 118 may be a flexible hose, a rigid connection such as pipe, or any other suitable structure. Pressurized air from an air source 120 is also provided to the dispensing module 106 to operate the dispensing module 106 as described above. Specifically, the pressurized air is used to rapidly move a piston to generate high pressure at an outlet of a nozzle for jetting liquid material as a discrete, small volume toward the substrate in a manner similar to that described above with respect to FIGS. 5A-5C.

Figure 8:
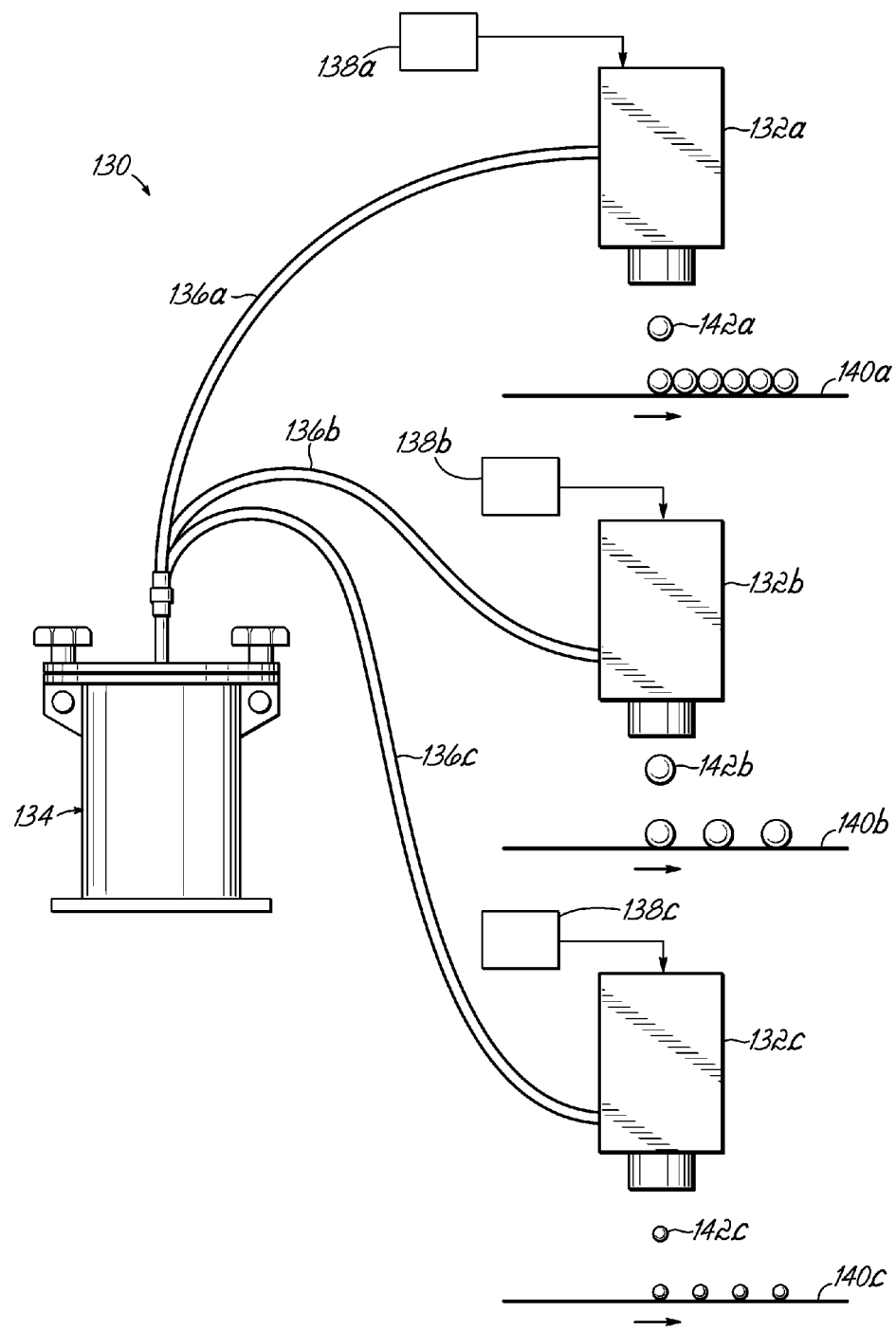
FIG. 8 is a schematic elevation view of a fourth exemplary dispensing system in accordance with the present disclosure.

FIG. 8 depicts another exemplary liquid dispensing system 130 for dispensing discrete, small volumes of highly viscous material, such as hot melt adhesive, to a substrate. In this embodiment, first, second, and third dispensing modules 132*a*, 132*b*, 132*c* are coupled to a common pressure pot 134 by respective low pressure liquid passageways 136*a*, 136*b*, 136*c*, such as flexible hoses, rigid pipe, or any other suitable structure. The pressure pot 134 may be adapted to melt and/or maintain a heated temperature of the hot melt adhesive. Each module 132*a*, 132*b*, 132*c* is operatively coupled to a high pressure source 138a, 138b, 138c for operating the respective dispensing modules 132a, 132b, 132c, in a manner as described above. The modules 132a, 132b, 132c may be coupled to the same pressure source, or individual pressure sources 138a, 138b, 138c may be dedicated to the respective modules 132a, 132b, 132c. In use, liquid material, such as hot melt adhesive, is supplied from the pressure pot 134 at a common pressure through the respective low pressure liquid passageways 136a, 136b, 136c to the respective dispensing modules 132a, 132b, 132c. Thereafter, each dispensing module 132a, 132b, 132c is operated to dispense discrete, small volumes of the liquid material to a respective substrate 140a, 140b, 140c. The modules 132a, 132b, 132c may be operated independently of one another such that the volume and frequency of dispensing the discrete volumes of liquid material may be different from module to module. For example, as depicted in FIG. 8, the first module 132a may dispense liquid material at a first discrete volume 142a and at a first frequency relative to the movement of the first substrate, such that the dispensed volumes 142a of liquid material are received on the substrate 140a in a closely spaced arrangement. The second dispensing module 132b may be operated to dispense a second discrete volume 142b of liquid material, larger than the first discrete volume 142a dispensed from the first dispenser 132a, and at a second frequency relative to the movement of the second substrate 140b such that the discrete volumes 142b of liquid material are received on the substrate 140b in a spaced arrangement. The third dispensing module 132c may be operated to dispense a third discrete volume 142c of liquid material, smaller than the first and second discrete volumes 142a, 142b of liquid material and at a frequency relative to the movement of the third substrate 140c such that the dispensed third discrete volumes 142c of liquid material are spaced apart on the substrate 140c at a desired distance.

Figure 9:
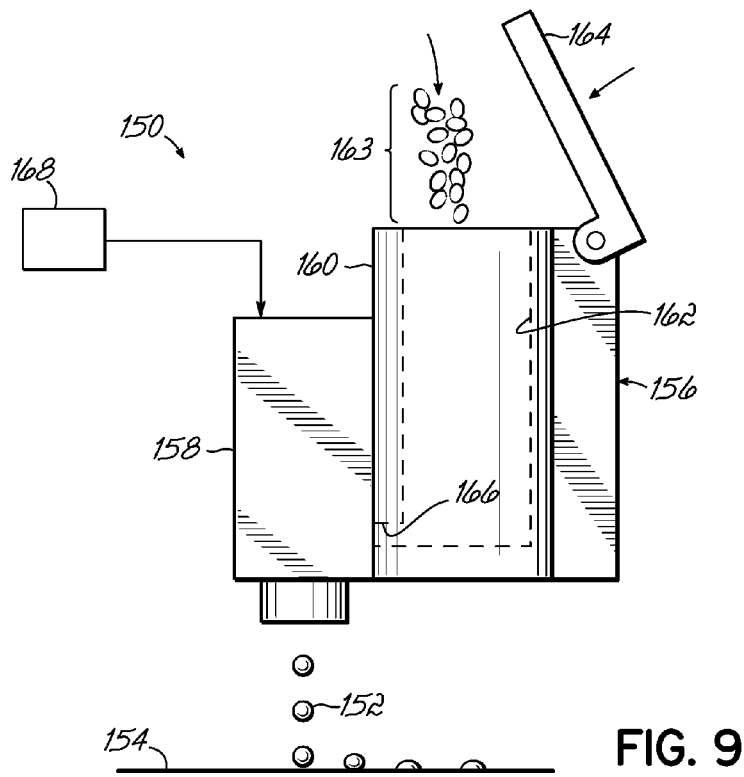
FIG. 9 is a schematic elevation view of a fifth exemplary dispensing system in accordance with the present disclosure.

FIG. 9 depicts yet another exemplary liquid dispensing system 150 for dispensing discrete, small volumes of viscous material 152 to a substrate 154. In this embodiment, the supply 156 for providing liquid material, such as hot melt adhesive, is directly coupled to and carried by the dispensing module 158. Because the dispensing module 158 is configured to dispense such small volumes of liquid material 152, the size of the adhesive supply 156 may be selected to contain only enough liquid material required to dispense during a given time period, such as an entire shift. The adhesive supply 156 comprises a housing 160, defining a reservoir 162 for receiving material to be dispensed, such as hot melt adhesive 163, in solid or particulate form, and a closure 164 selectively positionable over the reservoir 162. The reservoir 162 is configured to melt and/or maintain a heated temperature of the hot melt adhesive. Appropriate passageways 166 or other fluid connections provide fluid communication between the reservoir 162 and the dispensing module 158. Module 158 is operatively coupled to a source of pressurized air 168, and operates as described above. If the dispensing system 150 is pressurized to transfer adhesive from the reservoir 162 to the dispensing module 158, the closure 164 may be configured to seal the reservoir 162, at least to withstand the low pressure needed to transfer the hot melt adhesive from the reservoir 162 to the dispensing module 158.

Figure 10:
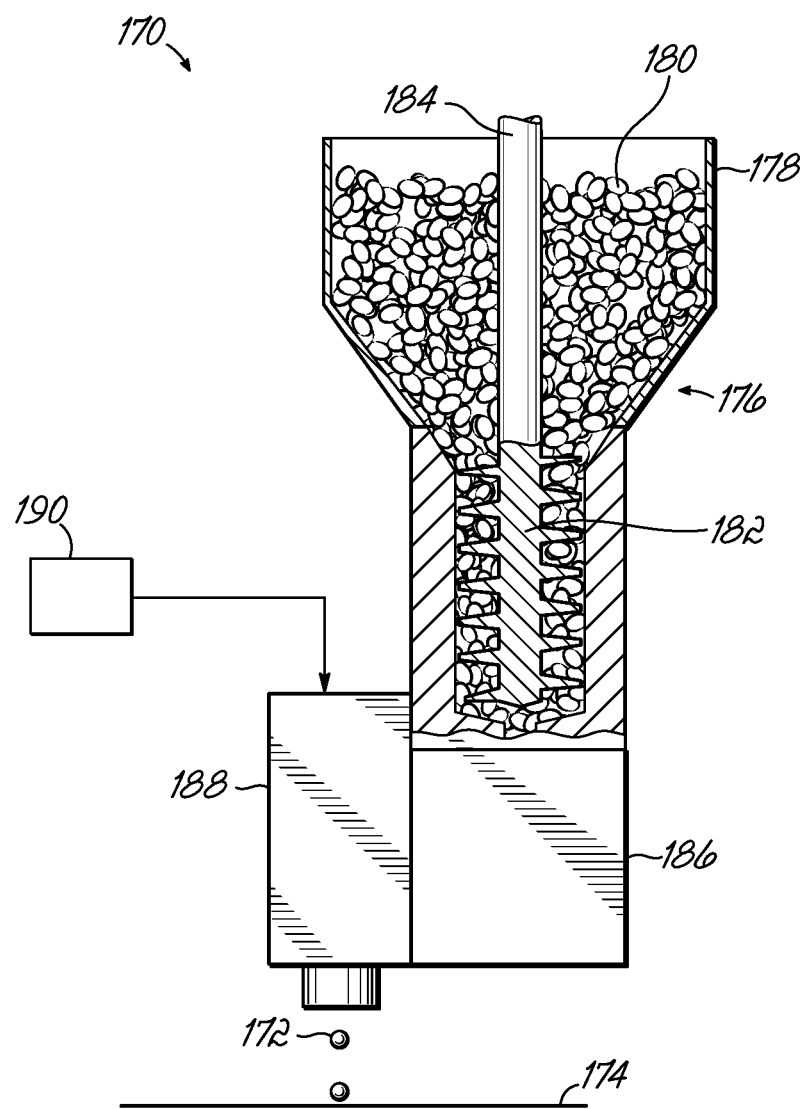
FIG. 10 is a partial cross-sectional view of a sixth exemplary dispensing system in accordance with the present disclosure.

FIG. 10 depicts yet another exemplary liquid dispensing system 170 for dispensing discrete, small volumes of highly viscous material 172 to a substrate 174, similar to the dispensing system shown 130 and described above with respect to FIG. 9, but wherein the adhesive supply 176 includes a hopper 178 for receiving hot melt adhesive 180 in solid, particulate form. The adhesive supply 176 further includes an auger 182 driven by a drive shaft 184 for transferring the particulate hot melt adhesive 180 from the hopper 178 to a manifold 186 for melting the hot melt adhesive and subsequently providing the melted hot melt adhesive to the dispensing module 188. In this embodiment, the supply pressure of the hot melt adhesive is provided by the auger 182. The dispensing module 188 is coupled to a source of pressurized air 190 for operating the dispensing module 188, and the dispensing module 188 otherwise operates as discussed above.

Figure 11:
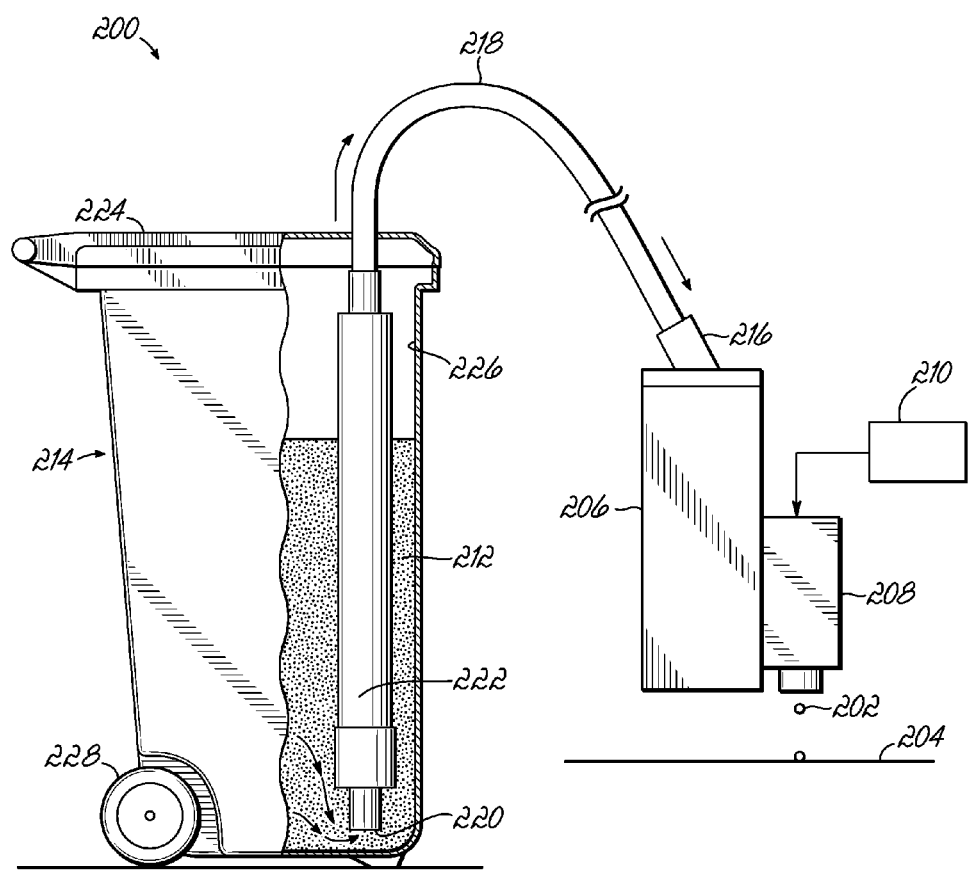
FIG. 11 is a schematic elevation view of a seventh exemplary dispensing system in accordance with the present disclosure.

FIG. 11 depicts another exemplary liquid dispensing system 200 for dispensing discrete, small volumes of highly viscous material 202, such as hot melt adhesive, to a substrate 204. The dispensing system 200 includes a manifold 206 and dispensing module 208 coupled to a source of pressurized air 210 for operating the dispensing module 208 as described above. Material 212 to be dispensed, such as hot melt adhesive, is supplied to the manifold 206 in particulate form from a tank 214 that is operatively coupled to an inlet 216 of the manifold 206 by a passageway 218. In this embodiment, the tank 214 is unpressurized and material 212 is drawn through an inlet 220 of a vacuum feed device 222 and transported through the passageway 218 to the manifold 206, whereafter the material is melted and directed to the dispensing module 208 in a manner similar to that described above. Manifold 206 is suitably configured to melt the material 212 and to supply the melted material 212 to module 208 at low pressure. The tank 214 may include a closure 224 for covering a reservoir 226 holding the liquid material 212, and wheels 228 to facilitate moving the tank 214. In use, high pressure is developed within the dispensing module 208 to jet a small, discrete volume of the liquid material 202 to the substrate 204 moving beneath the module 208.

Figure 12A:
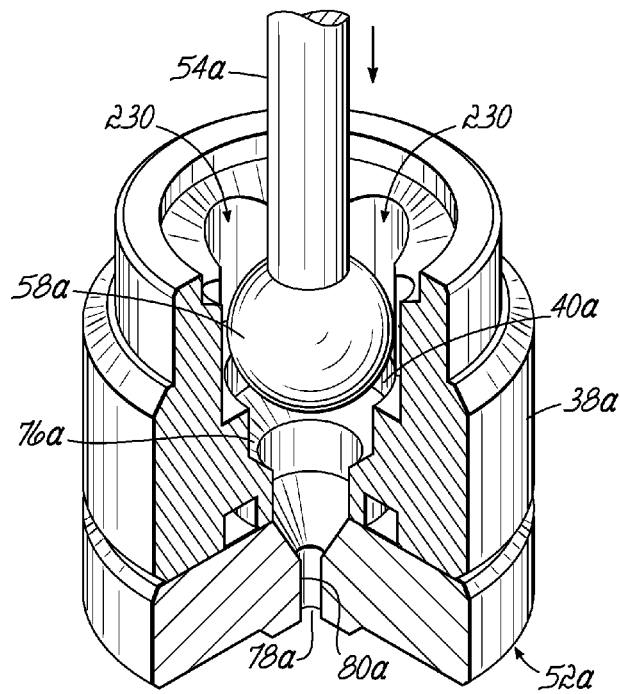
FIGS. 12A-12C are enlarged cross-sectional views illustrating operation of another exemplary nozzle for use with the dispensing system of FIG. 2.
Figure 12B:
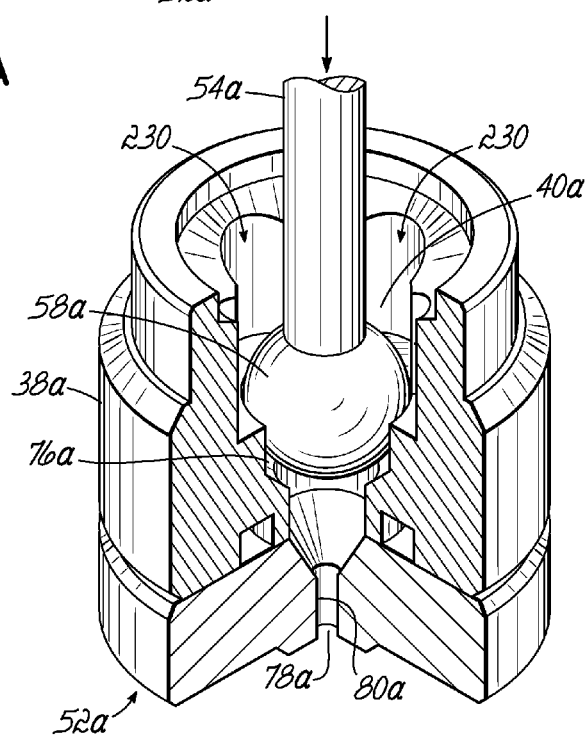
Figure 12C:
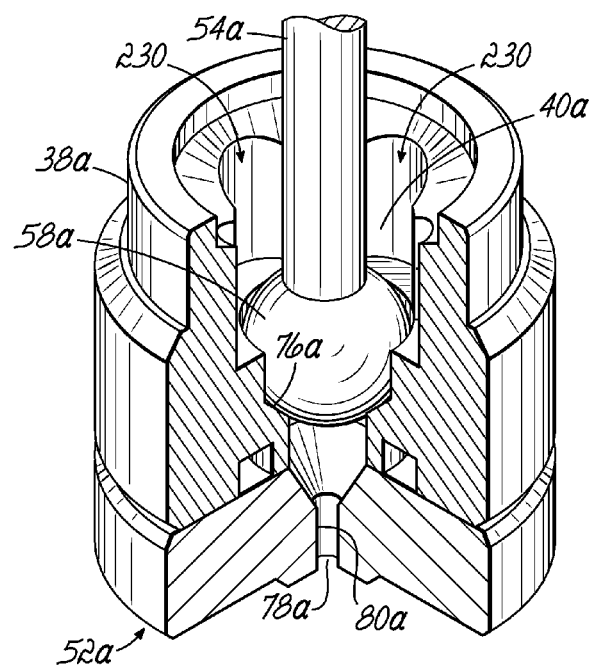
Figure 13A:
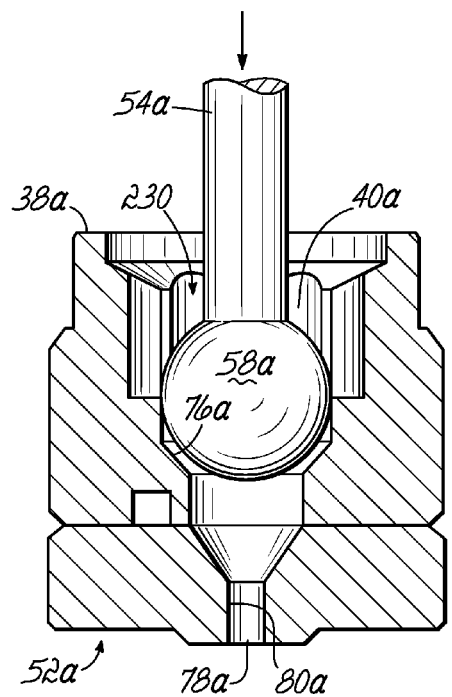
FIG. 13A is a cross-sectional view of the nozzle 52A with the piston tip in the position shown in FIG. 12B.
Figure 13B:
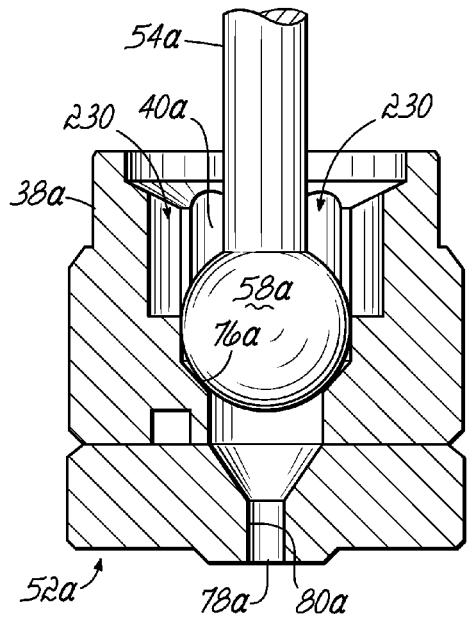
FIG. 13B is a cross-sectional view of the nozzle 52A with piston tip in the position shown in FIG. 12C.

FIGS. 12A-12C depict another exemplary embodiment of a nozzle 52a coupled to a module body 32a and including a nozzle body 74a in accordance with the principles of the present disclosure, wherein similar reference characters represent similar features. In this embodiment, nozzle body 74a includes a plurality of lobes 230 adjacent liquid chamber 40a to help guide piston tip 58a on piston rod 54a as the piston tip 58a is moved into and out of recess 76a in a manner similar to that described above with respect to FIGS. 5A-5C. When piston tip 58a is withdrawn from recess 76a (FIG. 12A), low pressure liquid material can flow into recess 76 through the lobes 230. As piston tip 58a enters recess 76a (FIG. 12B), piston tip 58a substantially seals the recess 76a in a manner similar to that described above. As piston tip 58a continues to move in a direction toward nozzle 52a, liquid material in the recess 76a is displaced though the nozzle passageway 80a and outlet 78a. When piston tip 58a is fully seated against recess 76a (FIG. 12C), the piston tip 58a prevents low pressure liquid material from "drooling" from the nozzle outlet 78a. FIG. 13A is a cross-sectional view of the nozzle 52A with piston tip 58a in the position shown in FIG. 12B. FIG. 13B is a cross-sectional view of the nozzle 52A with piston tip 58a in the position shown in FIG. 12C.

While various aspects in accordance with the principles of the invention have been illustrated by the description of various embodiments, and while the embodiments have been described in considerable detail, they are not intended to restrict or in any way limit the scope of the invention to such detail. The various features shown and described herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope of the general inventive concept.

What is claimed is:

1. An adhesive dispensing system, the system comprising:
an adhesive dispensing module having an inlet and an outlet, said adhesive dispensing module receiving liquid material through said inlet at low pressure and rapidly developing high pressure at said outlet to thereby jet the liquid material therefrom;
a supply of hot melt adhesive maintained at low pressure;
a low pressure liquid passageway communicating between said adhesive dispensing module inlet and said supply;
a liquid chamber communicating with said outlet;
a recess proximate said outlet; and
a piston tip disposed in said liquid chamber, wherein:
said recess is shaped complementary to said piston tip and adapted to receive said piston tip therein,
said piston tip develops said high pressure when said piston tip is moved into said recess, and
said piston tip is reciprocatingly movable within said liquid chamber between a first position wherein hot melt adhesive from said supply is admitted to said recess, a second position wherein said piston tip seals the liquid chamber from said supply of hot melt adhesive, and a third position wherein hot melt adhesive is jetted from said outlet under high pressure.

2. The adhesive dispensing system of claim 1, wherein said supply of hot melt adhesive is adapted to contain hot melt adhesive in solid form.

3. The adhesive dispensing system of claim 2, further comprising an auger for feeding hot melt adhesive toward said adhesive dispensing module.

4. The adhesive dispensing system of claim 2, further comprising a vacuum feed device for feeding hot melt adhesive toward said adhesive dispensing module.

5. The adhesive dispensing system of claim 1, further comprising first and second adhesive dispensing modules having respective first and second inlets and first and second outlets, said first and second inlets receiving liquid material at the same low pressure from said supply through respective first and second low pressure liquid passageways and generating high pressure proximate said respective outlets to jet liquid material therefrom at different rates.

6. The adhesive dispensing system of claim 1, wherein said supply is supported on said adhesive dispensing module.

7. An apparatus for jetting liquid material, the apparatus comprising:
a dispenser body couplable to a source of liquid material, said dispenser body including a liquid chamber;
a piston movably disposed within said liquid chamber and having a piston tip; and
a recess in fluid communication with said liquid chamber and with a liquid outlet, said recess shaped complimentary to said piston tip such that said piston tip is receivable within said recess, wherein:
said piston tip develops a high pressure when said piston tip is moved into said recess, and
said piston is reciprocatingly movable from a first position wherein said piston tip is spaced from said recess for liquid material from said source of liquid material to be admitted to said recess, to a second position for said piston tip to effectively seal off said recess from said source of liquid material to define a discrete volume between said piston tip and said recess, and then to a third position wherein said piston tip is received within said recess to displace said discrete volume from said recess through said liquid outlet for said liquid material to jet from said outlet under said high pressure.

8. The apparatus of claim 7, further comprising:
an open end in said dispenser body, said open end communicating with said liquid chamber; and
a nozzle operatively coupled to said dispenser body at said open end,
wherein said recess being formed in said nozzle.

9. The apparatus of claim 7, wherein said piston tip has a spherical shape.

10. A method of dispensing liquid material, the method comprising:
supplying liquid material to a liquid chamber at a pressure sufficient to fill the liquid chamber, but not to dispense the liquid material from an outlet associated with a recess and communicating with the liquid chamber;
effectively sealing off a discrete volume of liquid material proximate the recess by a piston tip disposed in the liquid chamber, wherein the recess is shaped complementary to the piston tip and adapted to receive the piston tip therein; and
generating a high pressure at the recess to jet the discrete volume of liquid material from the outlet when the piston tip is moved into said recess, wherein hot melt adhesive is jetted from said outlet under said high pressure.

11. The method of claim 10, wherein the high pressure generated is in the range of about 400 psi to about 2500 psi.

* * * * *